United States Patent [19]

Wakimoto et al.

[11] 4,269,760

[45] May 26, 1981

[54] FINE SPHERICAL POLYMER PARTICLES CONTAINING INORGANIC PIGMENT AND/OR COLORING AGENT AND PROCESS FOR THE PREPARATION THEREOF

[75] Inventors: Saburo Wakimoto, Hayama; Sadayasu Miyahara, Fujisawa; Yoshihiko Hyosu, Sagamihara, all of Japan

[73] Assignee: Sinloihi Company Limited, Osaki, Japan

[21] Appl. No.: 57,344

[22] Filed: Jul. 13, 1979

[30] Foreign Application Priority Data

Nov. 9, 1978 [JP] Japan .................................. 53-137337
Nov. 9, 1978 [JP] Japan .................................. 53-137338

[51] Int. Cl.$^3$ .................................................. C08J 3/20
[52] U.S. Cl. ............................. 260/42.53; 260/37 EP; 260/37 N; 260/42.57
[58] Field of Search ............... 260/42.53, 42.57, 37 N, 260/37 EP

[56] References Cited

U.S. PATENT DOCUMENTS

| 3,183,208 | 5/1965 | Jurgeleit ........................... 260/42.53 |
| 3,634,251 | 1/1972 | Maeda et al. ..................... 260/42.53 |
| 4,071,670 | 1/1978 | Vanzo et al. ...................... 260/42.53 |

*Primary Examiner*—Lewis T. Jacobs
*Attorney, Agent, or Firm*—Bucknam and Archer

[57] ABSTRACT

A suspension polymerization of polymerizable monomers is conducted in a system containing an inorganic dispersion stabilizer and an inorganic pigment and/or black coloring agent, in which the polymerizable monomers have an opposite charge in water to the inorganic dispersion stabilizer whereby the former is ionically bound with the latter. The suspension polymerization during the middle stage in which polymer particles are apt to stick together is stabilized and the polymer particles are prevented from coalescing so that fine spherical polymer particles are obtained with a uniform particle size distribution.

Also, the suspension polymerization is conducted having liquid resins involved in polymerizable monomers thereby to obtain non-sticky, free flowing particles. These particles adhere to paper sheets by mechanically smashing.

22 Claims, 2 Drawing Figures

FINE SPHERICAL POLYMER PARTICLES CONTAINING INORGANIC PIGMENT AND/OR COLORING AGENT AND PROCESS FOR THE PREPARATION THEREOF

BACKGROUND OF THE INVENTION

This invention relates to fine spherical polymer particles having a uniform particle size distribution and containing an inorganic pigment and/or black coloring agent and if desired, a resin liquid at normal temperature, which are obtained by effecting polymerization in a stable suspension system free of coalescence of particles and to a process for preparing the same.

In conventional methods for conducting a suspension polymerization in water, a suspending agent is used to prevent polymer particles from coalescing during the progress of polymerization. Generally, the suspending agents are classified broadly to a water-soluble high molecular substance and fine powders of difficultly soluble inorganic compound, and former being gelatine, starch, polyvinyl alcohol and others, the latter being difficultly soluble salts such as $BaSO_4$, $CaSO_4$, $BaCO_3$, $CaCO_3$, $MgCO_3$ and $Ca_3(PO_4)_2$, inorganic high molecules such as talc, clay, silicic acid and diatomic earth and powdery metal oxides. The suspension polymerization method for obtaining polymer particles containing an inorganic pigment or coloring agent is disclosed in, for example, U.S. Pat. No. 3,634,251 and Japanese Patent Publication No. 10231/61, in which the suspending agent used is adsorbed to polymer particles or dispersed between particles.

In addition to the selection of suspending agent, stirring is an important requirement for suspension polymerization, according to which particle size and polymerization stability are determined. Stirring at a low speed brings about gelation so that polymer particles cannot be obtained. On the contrary stirring at a high speed results in formation of polymer particles with a small size, however air penetrates into a polymerization vessel through a stirring apparatus so that the yield and degree of polymerization are reduced due to the hindrance effect of oxygen on reactive monomer radicals.

Connected with this is a problem of liquid ratio (polymerizable monomers: water), which is usually in the range of 1:5 to 1:8. If water is little and monomers are much, the polymerization reaction product is allowed to gel and the particle size distribution is broad in general.

It is very difficult to obtain polymer particles of less than $30\mu$ in size on a commercial scale by conventional suspension polymerization methods. Since polymer particles become sticky due to increasing viscosity during the progress of polymerization, coalescence of particles is unavoidable even under stirring so that particle sizes become large or gelation occurs. For avoiding such phenomena other additives are used in addition to the suspending agent. There are used a method of adding glycols or glycerine thereby to prevent particles from coalescing or a method of adding electrolytes such as NaCl or $Na_2SO_4$ so as to increase interfacial tension between water and particles. However, satisfactory effects have not been obtained yet.

SUMMARY OF THE INVENTION

An object of this invention is to provide fine spherical polymer particles of a uniform particle size distribution by stabilizing suspension polymerization during the initial and middle stage in which polymer particles are apt to stick together and preventing the polymer particles from coalescing.

Another object of this invention is to provide fine spherical polymer particles having a liquid resin included therein, which are non-sticky, free flowing particles but adhesive to paper sheets by mechanically smashing.

A further object of this invention is to provide a process for the preparation of fine spherical polymer particles by effecting polymerization in a stabilized suspension system free of coalescence of particles.

In accordance with this invention, there are provided fine spherical polymer particles with a uniform particle size distribution containing an inorganic pigment and/or black coloring agent, which comprises polymerized products from polymerizable monomers and an inorganic dispersion stabilizer in which the polymerizable monomers are charged with cation or anion and the inorganic dispersion stabilizer has an opposite charge to the monomers, the surface of said polymer particles being firmly bound through ionic bond to and being completely covered with the inorganic dispersion stabilizer.

Also, in accordance with this invention, there is provided a process for the preparation of fine spherical polymer particles with a uniform particle size distribution containing an inorganic pigment and/or black coloring agent, which comprises effecting a suspension polymerization of a combination of polymerizable monomers and inorganic dispersion stabilizer, in which the polymerizable monomers are charged in water (a) with cation by adding a cationic polymerizable monomer or difficultly water soluble organic amine or (b) with anion by adding an anionic polymerizable monomer and the inorganic dispersion stabilizer in water has an opposite charge to the polymerizable monomers, the suspension polymerization being under such a condition that the polymerizable monomers are ionically bound to and being covered with the inorganic dispersion stabilizer.

Further, in accordance with this invention, there are provided fine spherical polymer particles of a uniform particle size distribution having liquid resins involved therein by incorporating a resin liquid at normal temperature into the above polymerizable monomer and effecting a suspension polymerization in combination with the inorganic dispersion stabilizer as mentioned above.

DETAILED DESCRIPTION OF THE INVENTION

In the suspension polymerization according to this invention, the interface of polymerization monomer particles is charged with cation or anion in water, while the inorganic dispersion stabilizer in water has an opposite charge to said polymerizable monomer particles. Therefore, the suspensed polymerizable monomer particles and inorganic dispersion stabilizer interact to form stable agglomerates. The interface of polymerizable monomer particles are ionically bound to and uniformly covered with the inorganic dispersion stabilizer so that the particles are prevented from coalescing. The manner of ionically binding the inorganic dispersion stabilizer firmly to the polymerizable monomers is superior to conventional methods of adsorbing simply a dispersing agent onto polymer particles or dispersing same between particles to avoid coalescence. Accordingly, during the initial and middle period of polymerization during which polymer particles are apt to stick together, the interface of the particles is firmly bound through ionic bond and completely covered with the nonsticky inorganic dispersion stabilizer so that the coalescence of particles is not observed.

Polymerizable monomers which are usually used may be used for the purpose of this invention. Examples include styrene, α-chlorostyrene, acrylonitrile, methacrylonitrile, methyl methacrylate, vinyl chloride, methyl acrylate, ethyl methacrylate, ethyl acrylate, butyl methacrylate, butyl acrylate, 2-ethylhexyl methacrylate, 2-ethylhexyl acrylate, stearyl methacrylate, vinyl acetate, divinyl benzene, ethylene glycol dimethacrylate and others. The term of polymerizable monomers is used herein to include monomers having a resin liquid at normal temperature involved therein.

Ionic substances which may be used for the suspension polymerization of this invention are as follows:

(a) Cationic substance a-1 Cationic polymerizable monomers:

A nitrogen containing polymerizable monomer such as dimethylaminoethyl methacrylate, dimethylaminoethyl acrylate, 2-hydroxy-3-methacryloxypropyltrimethyl ammonium chloride, 2-hydroxy-3-acryloxypropyltrimethyl ammonium chloride, diacetoneacrylamide, acrylamide, N-vinylcarbazole, vinylpyridine, 2-vinylimidazole, diethylaminoethyl methacrylate, diethylaminoethyl acrylate, N-n-butoxyacrylamide and others.

a-2 Difficultly water soluble organic amines:

a-2-1 Aliphatic primary amines:

Aliphatic primary amines of 7 or more carbon atoms, for example, heptylamine, octylamine, dodecylamine and the like.

a-2-2 Aliphatic secondary amines:

Aliphatic secondary amines having a boiling point of more than about 80° C., for example, dipropylamine, diisopropylamine, dibutylamine, diamylamide, didodecylamine and others.

a-2-3 Aliphatic tertiary amines:

Aliphatic tertiary amines having a boiling point of more than about 80° C., e.g. triethylamine, tripropylamine, tributylamine, triamylamine, n-dodecyldimethylamine, n-tetradecyldimethylamine and others.

a-2-4 Aromatic amines:

Aniline, methylaniline, dimethylaniline, ethylaniline, diethylaniline, toluidine, dibenzylamine, tribenzylamine, diphenylamine, triphenylamine, naphthylamine and others.

The primary, secondary and tertiary amines are used in the form of an acidic aqueous solution.

(b) Anionic polymerizable monomers:

2-Acrylamide-2-methylpropanesulfonic acid, N-methylolacrylamide, methacrylic acid, acrylic acid, 2-hydroxyethylmethacrylate, 2-hydroxypropylmethacrylate, glycidylmethacrylate, polypropylene glycol monomethacrylate, polyethyleneglycol monomethacrylate, tetrahydrofurylmethacrylate, acid-phosphoxyethylmethacrylate and others.

Requirement for the above-mentioned ionic substances is to coexist in the above-mentioned polymerizable monomers and therefore, water soluble organic amines cannot be used. However, the above-mentioned ionic polymerizable monomers, even if water soluble, are copolymerized during the progress of polymerization to become a part of polymeric particles so that these monomers are not present in the aqueous layer.

These ionic substances may be used within the range of more than about 0.1%, preferably about 0.2% by weight of the polymerizable monomers. Though the upper limit is not particularly defined, with use of more than about 10% by weight the stability of polymerization and the particle size distribution are not further improved.

Inorganic dispersion stabilizers which may be used in this invention include, for example, colloidal silica ($SiO_2$), bentonite ($SiO_2/Al_2O_3$) and others as an anionic substance and aluminum oxide ($Al_2O_3$) as a cationic substance.

The inorganic dispersion stabilizer exhibits sufficient effects in a less amount as micronized to finer particles. Aerosil (trade name, colloidal silica sold by Degussa, West Germany) consists of the primary particle having an average size of 7 mμ–40 mμ and has a pH of 3.6–4.3 at a 4.0% concentration in water. Aluminum Oxide C (trade name, aluminum oxide sold by Degussa, West Germany) consists of the primary particle of 20 mμ in average size having an isoelectric point pH of about 9 and is used in neutral or acidic side. The inorganic dispersion stabilizer is used in the range of more than about 0.1 phr, preferably about 0.2 phr by weight of polymerizable monomers or ones having a resin liquid at normal temperature involved therein. Though the upper limit is not particularly defined, with use of more than about 20 phr by weight the stability of polymerization and the particle size distribution are not further improved.

Examples of inorganic pigments which may be used are powders of metals such as iron, nickel, manganese and cobalt, powders of a metal alloy of iron, nickel manganese, cobalt, aluminum, copper, lead, magnesium, tin, zinc, gold, silver, antimony, cadmium, calcium, selenium, titanium, tungsten, zirconium and others and mixtures thereof, metal oxides such as iron oxide, aluminum oxide, nickel oxide, chrome oxide, zinc oxide, titanium oxide, magnesium oxide and zirconium oxide, ferrite, blanc fixe, zinc white, white lead, zinc sulfide, lead yellow, zinc yellow, cadmium yellow, ultramarine, prussian blue, zinc green and so forth. The inorganic pigments are used alone or in mixture and their particle size is preferably, less than 1μ, preferably, 0.1–0.5μ. They are used in an amount of preferably, 0.1–70%, preferably 3–60% by weight of polymerizable monomers or monomers having a resin liquid at normal temperature involved therein. With amounts of less than 0.1% by weight the desired effects cannot be obtained, while with amounts of more than 70% by weight it is difficult to fix the inorganic pigment into the polymer particles and the particle size distribution becomes broad.

Black coloring agents which may be used are, for example, carbon blacks such as channel black, roller black, furnace black and thermal black and black coloring dyestuffs selected from the dyes of direct dyes, acid dyes, basic dyes, dispersed dyes, oil colors and the like. They are used alone or in mixture in an amount of preferably, 0.1–30%, preferably, 0.5–20% by weight of polymerizable monomers or ones having a resin liquid at normal temperature involved therein. With amounts of less than 0.1% by weight the desired effects cannot be obtained, while with amounts of more than 30% by weight it is difficult to fix the black coloring agent into the polymer particles and the particle size distribution becomes broad.

As for a polymerization initiator the conventional oil-soluble initiators may be used in the range of conventional temperatures. Examples of the initiator includes benzoyl peroxide, lauroyl peroxide, 2,2′-azobisisobutyronitrile, 2,2′-azobis-(2,4-dimethylvaleronitrile), o-chlorobenzoyl peroxide, o-methoxybenzoyl peroxide and so forth. Polymerization may be carried out under normal pressure or elevated pressurre.

Next, the characteristics of the suspension polymerization according to this invention will be explained as follows:

Temperature is elevated to a certain temperature under stirring and then, polymerization is commenced. When a sample after commencement of polymerization is taken up on a glass plate, it is observed by microscope that the polymer particle size is growing fine and uniform. After 15–30 minutes from the commencement of polymerization the particle size has a broad distribution of from fine particles to coarse particles. However, after 30–60 minutes coarse particles disappear and all the particles become fine. Thereafter, the polymer particle size remains unchanged till completion of polymerization.

On the contrary, in the method of using conventional suspending agents, when a sample during the beginning of polymerization is taken up on a glass plate, particles immediately coalesce to a few large agglomerates so that the measurement of particle size is impossible. Since particles coalesce during the latter period of polymerization, an exact measurement of particle size is impossible. The particle size after completion of polymerization has broad distribution of from fine particles to coarse ones.

It is considered from the foregoing that the stability of suspension in the conventional method relies chiefly on mechanical stirring and the coalescence and dispersion of particles are repeated so that the particle size distribution becomes broad. In the process according to this invention, however, the electrical and chemical stabilizing effect is very strong and mechanical stirring serves subsidiarily only. Therefore, there is little coalescence of particles so that a narrow distribution of particle size is easily obtained.

The significance of this invention is, thus, that the conventional idea that the stabilisation of fine particles in suspension polymerization requires a very difficult operation has completely been wiped out. Though not bound by a theoretical explanation, the mechanism of the electrical and chemical stabilizing effect according to this invention will be explained as follows:

(1) Bentonite and colloidal silica contain a slight amount of a silanol group —SiOH and dissociate in water to form —SiO$^-$H$^+$. Thus, they are charged with negative electricity and rendered anionic in water. Therefore polymerizable monomers containing a cationic substance are firmly bound ionically to and covered completely with the above anionic dispersion stabilizer. Namely, the anionic stabilizer present at the interface of the polymerizable monomer particles forms a hydrated phase around the particles so that they are remarkably stabilized. Thus, during the initial and middle stage of polymerization at which polymer particles are apt to stick together, the interface of particles are completely covered with the non-sticky, inorganic dispersion stabilizer and accordingly, the coalescence of particles is not observed.

(2) Aluminum oxide having an isoelectric point at pH of about 9 is charged with positive electricity in neutral and acidic sides and rendered cationic. Therefore polymerizable monomers containing an anionic polymerizable monomer are ionically bound firmly to and covered completely with the above cationic dispersion stabilizer.

The fact that the polymer particles of this invention have an interfacial structure having the inorganic dispersion stabilizer bound firmly through ionic bond thereto has been confirmed by electrophoresis as described hereinafter. It has been made clear that a sample using the anionic dispersion stabilizer is transferred to the anode and the slipping plane around particles (the particle surface when dried) is charged with negative electricity. It has, also, been made clear that a sample using the cationic dispersion stabilizer is transferred to the cathod and the particle transfer surface is charged with positive electricity.

The suspension polymerization according to this invention has the following advantages:

(1) By varying properly a stirring speed, amounts of ionic substance and inorganic dispersion stabilizer, it is possible to properly determine the particle size.

(2) Polymers obtained have a narrow particle size distribution because of no coalescence.

(3) Since the ratio of polymer particles to water can be increased in suspension polymerization, a large improvement in productivity becomes possible.

Further, polymer particles having a resin liquid at normal temperature (hereinafter referred to as a liquid resin) involved therein are obtained by mixing the liquid resin with polymerizable monomers and conducting the suspension polymerization according to this invention. It has been found that the particles obtained are non-sticky, free-flowing particles and do not melt in boiling water. On the other hand, when these particles are taken up on a watch glass and rubbed several times by the head of spoon, they exhibit stickiness. Also, when uniformly placed on a paper sheet and passed between pressed metal rollers, the particles are allowed to adhere to the sheet. It is considered from these experimental data that the polymer particles of this invention have the liquid resin fixed therein.

In this way the polymer particles having the liquid resin involved therein are non-sticky, free-flowing particles, but exhibit a stickiness or adhesiveness to paper sheets by mechanically smashing. Further, resins non-copolymerizable with the polymerizable monomers may be used as the liquid resin to obtain polymer particles with the pressure sensitive properties. Also, polymer particles with controlled softening point are obtained by varying the degree of the liquid resin.

Examples of the liquid resin are aromatic petroleum resin, e.g. Piccovar resins (trade name, manufactured by Esso Pet. Chemical Company), α-pinene resins, β-pinene resins, dipentene resins, terpene-phenol resin, α-pinene-phenol resins, styrene resins, epoxy resins, polyamide resins and others. They may be used alone or in mixture and the amount is within the range of preferably, 10–90%, more preferably 30–70% by weight of polymerizable monomers. In the case of less than 10% by weight, the effect is little, while in the case of more than 90% by weight sticky polymer particles are obtained.

The liquid resin used herein includes also a resin liquid at normal temperature containing a resin solid at normal temperature. Such solid resins are, for example, polystyrene, polyacrylate, polymethacrylate, vinyl type copolymers such as styrene-acrylonitrile-indene terpolymer and styrene-methylmethacrylate-butylmethacrylate terpolymer, polyamides, polyesters, polyvinyl acetate, ethylenevinyl acetate copolymer, vinyl chloride-vinyl acetate-maleic anhydride copolymer, cellulose resins, coumarone-indene resins, epoxy resins, oil modified epoxy resins, rosin modified phenolic resins, rosin modified alkyd resins, dammar resins, ketone resins, maleic acid resins and the like. They may be used alone or in mixture. Also, the solid resins may be used in combination with rubbers such as cyclorubber and copal rubber, or waxes such as carnauba wax and microcrystalline wax. The solid resins are used in an amount of 5-20% by weight of the liquid resin. With addition of the solid resin, controlling of the polymer particle size becomes easier. In the case of less than 5% by weight the effect is little, while in the case of more than 20% by weight a further effect cannot be obtained.

The control of particle size relies chiefly on stirring strength, type of impellers and the like. Generally, the stronger stirring, the finer particle size is obtained. However, the stirring strength has its limit on a commercial scale and there is also the problem of penetration of air into a polymerization vessel through a stirring apparatus.

It has been found that a specific stirring apparatus can be used in the suspension system stabilized chemically according to this invention, which is obtained by the characteristic combination of polymerizable monomers with inorganic dispersion stabilizer. For example, there are TK Homomixer, TK Pipeline Homomixer (trade name, Tokushukika Kogyo Comp, Japan) and Microagiter (trade name, Shimazaki Seisakusho, Japan). These apparatuses consist of a high-speed rotating impeller (turbine) and a fixed impeller (stator) and form a precise, uniform and minute void between the two impellers. Strong action of shearing force, rupture, impact and turbulent flow formed in the minute void brings about effects of atomization, mixing, emulsification and dispersion. In these apparatuses the penetration amount of air during stirring is extremely low and accordingly, the polymer yield is not reduced.

Figure 1:
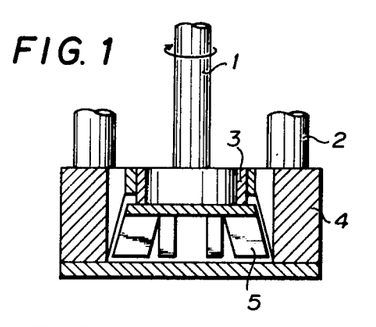
FIG. 1 represents a sectional view of TK Homomixer of a high shearing and stirring force used in a suspension polymerization according to this invention.

In FIG. 1 representing a sectional view of TK Homomixer, 1: turbine shaft, 2: shaft, 3: bearing, 4: stator, 5: turbine.

It has been found that when these apparatuses are used, it is possible to industrially prepare polymer particles of less than $30\mu$ under the specified conditions, which have been deemed to be very difficult to prepare. The specific stirring apparatus enable to achieve the minimum particle size of $2-3\mu$. The specified conditions are as follows:

(1) The specific stirring apparatuses with high shearing force are operated with a speed of more than 1000 rpm.

(2) Ionic substances are used in an amount of more than 0.4%, preferably 0.5% by weight of polymerizable monomers.

(3) Inorganic dispersion stabilizer is used in an amount of more than 0.4%, preferably 0.5% by weight of polymerizable monomers.

A further explanation will be made in detail hereunder. Stirring is effected in the suspension polymerization system using the high shearing apparatus and 15-30 minutes after commencement of polymerization, a stable suspension of particles of less than $30\mu$ having approximately a uniform particle size distribution are observed with a microscope. Thereafter, till completion of the polymerization the particle size remains unchanged without coalescence of particles. Further, even if the high shearing and stirring apparatus is changed to conventional stirring apparatus when a stable suspension condition has been obtained after commencement of polymerization, the particle size remains unchanged without coalescence till completion of polymerization.

Particularly, in the case of difficulty water soluble and water insoluble cationic monomers (e.g. diethylaminoethyl methacrylate, diethylaminoethyl acrylate, N-n-butoxyyacrylamide, vinylpyridine and the like) and difficulty water soluble organic amines, it is observed by a microscope that a stable suspension of particles of less than $30\mu$ having approximately uniform particle size distribution are obtained after 15-30 minutes at normal temperature (a condition under which polymerization is not commenced) by means of the high shearing and stirring apparatus. Thereafter, even when the high shearing apparatus is changed to conventional stirring apparatus and the polymerization system is elevated to a certain temperature to effect polymerization, the particle size remains unchanged without coalescence of particles till completion of polymerization.

In methods using conventional suspending agents, particles of less than $30\mu$ cannot be obtained with use of the above-mentioned specific stirring apparatus. Resins are formed in the precise, uniform and minute void between the turbine and the stator and eventually, gelation occurs. For overcoming these problems the specific stirring apparatus was changed to conventional stirring apparatus immediately before the formation of resins in the void, however, polymers containing irregular shapes and agglomerates were only obtained at the end of polymerization.

Also, when the specific stirring apparatus was changed to the conventional stirring apparatus 15-30 minutes after commencement of polymerization, polymer particles obtained at the end of polymerization had a broad particle size distribution containing sizes of more than $50\mu$, which were not different in any way from polymer particles obtained by effecting polymerization in the conventional stirring apparatus. Further, when stirring was effected using the high shearing apparatus for one hour at temperatures under which no polymerization is commenced and thereafter, the specific stirring apparatus was changed to the conventional stirring apparatus, polymer particles obtained at the end of polymerization were not in any way different from polymer particles obtained by effecting polymerization under the conventional stirring apparatus.

As apparent from the foregoing, the strong action of shearing force, rupture, impact and turbulent flow formed in the minute void between the turbine and the stator cannot be applied to effect a stable suspension polymerization according to conventional methods. It is clear that the above high shearing and stirring force can be employed in a suspension system electrically and chemically stabilized according to this invention. Also, the solution ratio in polymerization system (ratio of polymerizable monomers:water) which is normally between 1:5 and 1:8 may be within the range of 1:1–1:2 in the polymerization according to this invention. Therefore a yield of polymer particles is greatly improved and industrial advantages are remarkably increased.

Fine spherical polymer particles containing an inorganic pigment and/or black coloring agent according to this invention may be used in form of a dispersion in water as they are, or if desired, may be dried by means of conventional driers, e.g. a hot air circulating drier, a spray drier, a drum drier and a fluid type drier. The superiority of this invention is also observed in the drying step. In the conventional method using water-soluble high molecules such as polyvinyl alcohol, starch or gelatin as the suspending agent, when the above-mentioned drying process is carried out, the water-soluble high molecules serve as a binder so that polymer particles agglomerate and eventually, form a film in part. For avoiding such phenomena a filtrating step using a large amount of water is used to remove the water-soluble high molecules with washing, however, it results in lowering of productivity.

According to the process of this invention, polymer particles with a uniform particle size distribution obtained by polymerization can be dried immediately because no water-soluble high molecules as the suspending agent are used. Fine spherical polymer particles of this invention have industrial advantages as follows:

(1) They may be used as a coloring agent.

(2) They have good impact strength and resistance toward mechanical friction.

(3) They have good flowability.

(4) They can be charged equally on the surface and either with negative or with positive by properly selecting polymerizable monomers, inorganic pigments and black coloring agents.

(5) When magnetic iron oxide, magnetic ferroalloy and the like are used as the inorganic pigment, polymer particles obtained are rendered magnetic so that they have magnetic response and are sensitive in magnetic field.

(6) When an electrically conductive carbon black is used as the black coloring agent, polymer particles obtained are rendered conductive so that they have electrical response and sensitive in electric field.

Thus, an inorganic pigment containing and/or black colored polymer particles which have characteristics as mentioned above can be applied in various fields.

This invention will be illustrated by the following Examples.

EXAMPLE 1

0.8 g of Aerosil 200 (trade name, manufactured by Degussa, West Germany) and 400 ml of distilled water were charged into a 2.0 l separable flask. There was added 400 g of styrene having 250 g of ferrosoferric oxide, 0.8 g of dimethylaminoethyl methacrylate and 1.2 g of benzoyl peroxide dissolved therein. The mixture was elevated to 90° C. while stirring at 100 rpm and polymerization was effected for six hours. After completion of polymerization black spherical particles of 40–50$\mu$ in average particle size were obtained.

Besides, the above procedure was repeated using 20 g of carbon black (Raven 8000, trade name, manufactured by Cities Service Co., Columbian Division, U.S.A.) instead of ferrosoferric oxide. Black spherical particles of 40–50$\mu$ in average particle size were obtained.

EXAMPLE 2

4 g of Aerosil 380 (trade name, manufactured by Degussa, West Germany) and 400 ml of distilled water were charged into a 2.0 l separable flask.

There were added 400 g of styrene having 100 g of carbon black (MA-100, trade name, manufactured by Mitsubishi Chemicals, Japan), 2 g of dodecylamine and 1 g of azobisisobutyronitrile dissolved therein. The mixture was heated to 80° C. while stirring at 100 rpm and polymerization was effected for six hours. After completion of polymerization black spherical particles of 40–50$\mu$ in average particle size were obtained.

Besides, the above procedure was conducted using 40 g of rutile type titanium oxide instead of 100 g of carbon black. White spherical particles of 40–50$\mu$ in average particle size were obtained.

EXAMPLE 3

8 g of Aerosil 200 and 500 ml of distilled water were charged into a 2.0 l separable flask.

There were added 400 g of styrene having 400 g of barium ferrite, 2 g of diethylaminoethyl methacrylate and 1 g of 2,2'-azobis-(2,4-dimethylvaleronitrile) dissolved therein. The mixture was heated to 65° C. while stirring at 200 rpm and polymerization was effected for six hours. After completion of polymerization brown spherical particles of 100–120$\mu$ in average particle size were obtained.

Besides, the above procedure was repeated using 15 g of Nigrosine NB conc (trade name, C. I. Acid Black 2 manufactured by Sumitomo Chemical Industries, Japan) instead of 400 g of barium ferrite. Black spherical particles with slightly blue-purple color of 100–120$\mu$ in average particle size were obtained.

EXAMPLE 4

4 g of Aerosil Mox 170 (trade name, manufactured by Degussa, West Germany) and 600 ml of distilled water were charged into a 2.0 l separable flask.

There were added 400 g of methyl methacrylate having 50 g of Aizen Opal Black WGH (trade name, C. I. Acid Black 52 manufactured by Hodogaya Chemical Co., Ltd., Japan), 16 g of 2-hydroxy-3-acryloxypropyl-trimethyl ammonium chloride and 1 g of lauroyl peroxide dissolved therein. The mixture was heated to 70° C. while stirring at 200 rpm and polymerization was effected for five hours. After completion of polymerization reddish-black colored spherical particles of 30–40$\mu$ in average particle size were obtained.

Besides, the above procedure was repeated using 100 g of fine powders of iron-nickel alloy instead of 50 g of Aizen Opal Black WGH. Grey-brown spherical particles of 30–40$\mu$ in average particle size were obtained.

EXAMPLE 5

2 g of Aluminum Oxide C (trade name, manufactured by Degussa, West Germany) and 400 ml of distilled water were charged into a 2.0 separable flask.

There were added 400 g of methyl methacrylate having 100 g of magnetic iron powders, 2 g of methacrylic acid and 4 g of azobisisobutyronitrile dissolved therein. The mixture was heated to 80° C. while stirring at 200 rpm and polymerization was effected for five hours. After completion of polymerization black-brown spherical particles of 30–40$\mu$ in average particle size were obtained. The colored spherical resin particles were magnetic.

Besides, the above procedure was repeated using 40 g of Diacryl Supra Black BSL (trade name, C. I. Basic Black 8 manufactured by Mitsubishi Chemicals, Japan) instead of 100 g of magnetic iron powders. Bluish black spherical particles of 30–40μ in average particle size were obtained.

EXAMPLE 6

8 g of Aluminum Oxide C and 500 ml of distilled water were charged into a 2.0 l separable flask.

There were added 300 g of methyl methacrylate having 150 g of Monarch #800 (trade name, carbon black manufactured by Cabot Corp., U.S.A.), 20 g of glycidyl methacrylate, 0.8 g of azobisisobutyronitrile and 80 g of acrylonitrile dissolved therein. The mixture was heated to 70° C. while stirring at 200 rpm and polymerization was effected for five hours. After completion of polymerization black spherical particles of 20–30μ in average particle size were obtained.

Besides, the above procedure was repeated using 20 g of α-iron sesquioxide instead of 150 g of Monarch #800. Red spherical particles of 20–30μ in average particle size were obtained.

EXAMPLE 7

2 g of Aerosil 200 and 400 ml of distilled water were charged into a 2.0 l glass vessel. There were added 400 g of styrene having 150 g of γ-iron sesquioxide, 2 g of N-n-butoxyacrylamide and 1.2 g of benzoyl peroxide dissolved therein. The mixture was heated to 80° C. while stirring at 1000 rpm using TK Homomixer (trade name, manufactured by Tokushukika Kogyo Comp., Japan). Fifteen minutes after heating the particle size showed 15–20μ in average. After polymerization was conducted further six hours, the particle size remained unchanged and brown spherical particles of 15–20μ in average particle size were obtained.

Besides, using 150 g of Printex G (trade name, carbon black manufactured by Degussa, West Germany) instead of 150 g of γ-iron sesquioxide, the above procedure was repeated. Black spherical particles of 15–20μ in average particle size were obtained.

EXAMPLE 8

4 g of Aerosil Mox 80 and 400 ml of distilled water were charged into a 2.0 l glass vessel. There were added 400 g of styrene having 80 g of Direct Deep Black GX (trade name, C. I. Direct Black 38 manufactured by Hodogaya Chemical Co., Ltd., Japan), 4 g of dicocoamine and 1 g of azobisirobutyronitrile dissolved therein. The mixture was heated to 80° C. while stirring at 3000 rpm using Microagitor (trade name, manufactured by Shimazaki Seisakusho, Japan). Fifteen minutes after heating the particle size was 10–15μ in average and remained unchanged even after completion of six hours' polymerization.

Greenish black spherical particles of 10–15μ in average particle size were obtained.

Besides, using 150 g of finely powdered nickel-iron-cobalt alloy instead of 80 g of Direct Deep Black GX, the above procedure was repeated. Grey brown spherical particles of 10–15μ in average particle size were obtained.

EXAMPLE 9

8 g of Aerosil 200 and 500 ml of distilled water were charged into a 2.0 l glass vessel. There were added 400 g of styrene having 200 g of ferrosoferric oxide, 2 g of diethylaminoethyl methacrylate and 1 g of 2,2'-azobis-(2,4-dimethylvaleronitrile) dissolved therein.

The mixture was heated to 65° C. while stirring at 3000 rpm using the TK Homomixer. Fifteen minutes after heating the particle size was 10–15μ in average and remained unchanged even after completion of six hours' polymerization. Black spherical particles of 10–15μ in average particle size were obtained.

Besides, using 20 g of Raven 500 (trade name, carbon black manufactured by Columbian Comp., U.S.A.) instead of 200 g of ferrosoferric oxide, the above procedure was repeated. Black spherical particles of 10–15μ in average particle size were obtained. Charging amount of the black particles was measured by the Blow off method. The value of −20 μc/g was obtained. Softening point of each of the products by the former and the latter procedures was common and showed 100° C. according to the ring and ball method. The particles were observed by a microscope and the particle number distribution is set forth in the following figure.

|          | Particle Number Distribution % |
|----------|-------------------------------|
| 30–15 μ  | 5                             |
| 15–10 μ  | 80                            |
| 10–5 μ   | 10                            |
| 5–1 μ    | 5                             |

Figure 2:
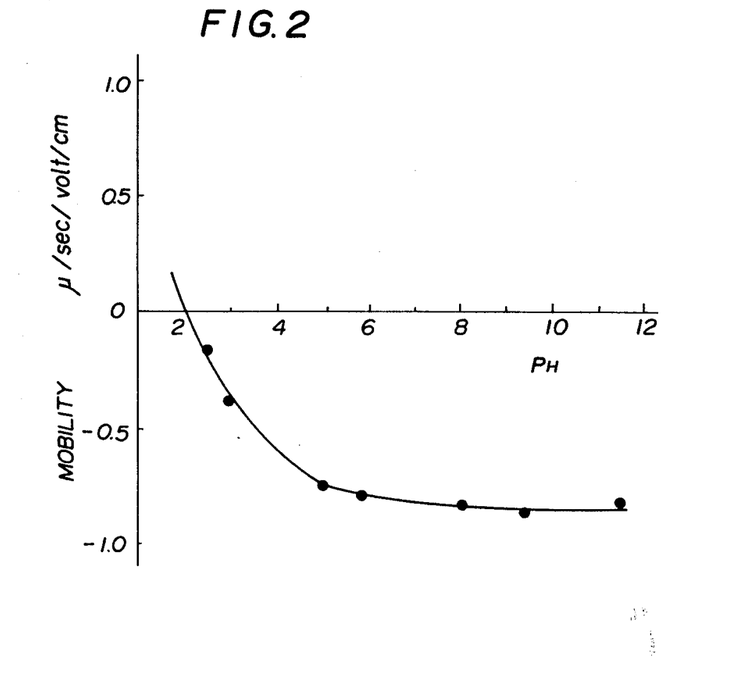
FIG. 2 represents a graph indicating test results of electrophoresis on a suspension of polymers in solution according to this invention.

1.0 ml of the suspension obtained in each procedure of Example 9 was added to 100 ml of distilled water. The resulting suspension having a pH of 5.9 was charged into a quartz cell of 1.0 mm in thickness and 70 cm in length and subjected to electrophoresis under applied voltage of 14 Volt/cm. Polymer particles were transferred to the anode and the mobility was −0.8 μ/sec/Volt/cm. The mobility was measured adjusting a pH with KOH and HCl. The results are given in FIG. 2.

EXAMPLE 10

8 g of Aerosil 200 and 500 ml of distilled water were charged into a 2.0 l glass vessel.

There were added 400 g of styrene having 5 g of Miketazol Black 5GF (trade name, C. I. Disperse Black 30 manufactured by Mitsui Toatsu Chemicals Co., Ltd., Japan), 2 g of diethylaminoethyl methacrylate and 1 g of 2,2'-azobis-(2,4-dimethylvaleronitrile) dissolved therein. The mixture was heated to 65° C. while stirring at 3000 rpm using the TK Homomixer. Fifteen minutes after heating, the particle size was 10–15μ in average. Thereafter the specific stirring apparatus was changed to a conventional stirrer of 100 rpm and polymerization was continued for six hours. The particle size remained unchanged till completion of polymerization. Greenish black spherical particles of 10–15μ in average particle size were obtained.

Besides, using 10 g of fine powders of magnetic aluminum-nickel-cobalt alloy instead of 5 g of Miketazol Black 5GF, the above procedure was repeated. Grey blue spherical particles of 10–15μ in average particle size were obtained. The colored spherical resin particles were magnetic.

EXAMPLE 11

2 g of Aluminum Oxide C and 600 ml of distilled water were charged into a 2.0 l glass vessel.

There were added 400 g of methyl methacrylate having 15 g of ultramarine, 2 g of acrylic acid and 1 g of azobisisobutyronitrile dissolved therein. The mixture was heated to 80° C. while stirring at 2000 rpm using the TK Homomixer. Thirty minutes after heating the particle size was 15–20μ in average, and remained unchanged even after polymerization for five hours. Blue spherical particles of 15–20μ in average particle size were obtained.

Besides, using 30 g of Nigrosine Base LK (trade name, C. I. Solvent Black 7 manufactured by Badische A. G., West Germany) instead of 15 g of ultramarine, the above procedue was repeated. Black spherical particles with slightly blue-purple color, of 15–20μ in average particle size were obtained.

EXAMPLE 12

2 g of Aluminum Oxide C and 600 ml of distilled water were charged into a 2.0 l glass vessel.

There were added 400 g of methyl methacrylate having 30 g of MCF-88 (trade name, carbon black by Mitsubishi Chemicals), 2 g of acrylic acid and 1 g of azobisisobutyronitrile dissolved therein. The mixture was heated to 80° C. while stirring at 2000 rpm using the TK Homomixer. Thirty minutes after heating the particle size was 15–20μ in average. Thereafter the specific stirring apparatus was changed to a conventional stirrer of 100 rpm and polymerization was continued for five hours. Till completion of polymerization the particle size remained unchanged. Black spherical particles of 15–20μ in average particle size were obtained. Besides, using 20 g of lead yellow instead of 30 g of MCF-88, the above procedure was conducted. Yellow spherical particles of 15–20μ in average particle size were obtained.

EXAMPLE 13

8 g of Aerosil 200 and 500 ml of distilled water were charged into a 2.0 l glass vessel.

There were added 400 g of styrene having 150 g of zinc green, 2 g of diethylaminoethyl methacrylate and 1 g of 2,2'-azobis-(2,4-dimethylvaleronitrile) dissolved therein. The mixture was stirred using the TK Homomixer of 3000 rpm at normal temperature. The particle size was 10–15μ in average 15–20 minutes after stirring. Thereafter the specific stirring apparatus was changed to a conventional stirrer of 100 rpm and polymerization was continued at 65° C. for six hours, during which the particle size remained unchanged. Green spherical particles of 10–15μ in average particle size were obtained.

Besides, using 50 g of Printex 400 (trade name, carbon black manufactured by Degussa Comp., West Germany) instead of 150 g of zinc green, the above procedure was effected. Black spherical particles of 10–15μ in average particle size were obtained.

EXAMPLE 14

Polymerization was conducted in the same manner as in Example 13 using N-n-butoxyacrylamide instead of diethylaminoethyl methacrylate. Green spherical particles of 10–15μ in average particle size were obtained by the former procedure of Example 13 and by the latter black spherical particles of 10–15μ in average particle size were obtained.

REFERENCE EXAMPLE 1

A polymerization reaction mixture which was obtained from the same formulation as in Example 3 except diethylaminoethyl methacrylate was allowed to gel and no polymer particles were obtained.

REFERENCE EXAMPLE 2

A polymerization reaction mixture which was obtained from the same formulation as in Example 3 except Aerosil 200 was allowed to gel and no polymer particles were obtained.

REFERENCE EXAMPLE 3

4 g of Gosenol GM-17 (trade name, a partially saponified polyvinyl alcohol, manufactured by Nihon Gosei Kagaku Koygo, Japan) and 500 ml of distilled water were charged into a 2.0 l separate flask.

There were added 400 g of styrene having 400 g of barium ferrite and 1 g of 2,2'-azobis-(2,4-dimethylvaleronitrile) dissolved therein. The mixture was heated to 65° C. while stirring at 200 rpm and subjected to polymerization for six hours. Then brown spherical particles in mixture of 1–2 mm and 200–300μ in particle size were obtained.

Besides, using 20 g of MA-100 (trade name, carbon black manufactured by Mitsubishi Chemicals, Japan) instead of 400 g of barium ferrite, the above procedure was conducted. Black spherical particles in mixture of 1–2 mm and 200–300μ in particle size were obtained.

REFERENCE EXAMPLE 4

Polymerization was conducted in the same manner as in Reference Example 3 except stirring at 400 rpm. The reaction products had strong monomer odour and the conversion was about 70 wt.%. According to the former procedure of Reference Example 3 brown spherical particles in mixture of 1–1.5 mm and 200–300μ in particle size were obtained. By the latter black spherical particles in mixture of 1–1.5 mm and 200–300μ in particle size were obtained.

REFERENCE EXAMPLE 5

The polymerization reaction mixture of the same formulation as in Reference Example 3 was stably dispersed using the TK Homomixer of 3000 rpm for thirty minutes. Next, using a conventional stirrer of 200 rpm, the polymerization reaction mixture was heated to 65° C. and subjected to polymerization. Brown spherical particles in mixture of 1–2 mm and 200–300μ in particle size were obtained by the former procedure of Reference Example 3 and black spherical particles in mixture of 1–2 mm and 200–300μ in particle size by the latter.

EXAMPLE 15

0.8 g of Aerosil 200 and 400 ml of distilled water were charged into a 2.0 l separable flask.

There was added a mixture of 250 g of ferrosoferric oxide, 0.8 g of dimethylaminoethyl methacrylate, 1.2 g of benzoyl peroxide, 80 g of Piccolastic A-5 (trade name, styrene resin, manufactured by Esso Pet. Chemicals, U.S.A.) and 320 g of styrene. The mixture was elevated to 90° C. while stirring at 100 rpm and polymerization was effected for six hours. After completion of polymerization black spherical particles of 40–50μ in average particle size were obtained and quite non-sticky.

Besides, the above procedure was repeated using 20 g of Raven 8000 (carbon black, trade name) instead of ferrosoferric oxide. Black spherical particles of 40–50μ in average particle size were obtained and quite non-sticky.

EXAMPLE 16

4 g of Aerosil 380 and 400 ml of distilled water were charged into a 2.0 l separable flask.

There was added a mixture of 100 g of MA-100 (carbon black, trade name), 2 g of dodecylamine, 1 g of azobisisobutyronitrile, a resin solution having 20 g of Hitanol 60G (trade name, rosin modified phenol resin, anufactured by Hitachi Kasei, Japan) dissolved in 140 g of Piccovar AP-10 (trade name, aromatic petroleum resin, manufactured by Esso Pet. Chem., U.S.A.) and 240 g of styrene.

The mixture was heated to 80° C. while stirring at 100 rpm and polymerization was effected for six hours. After completion of polymerization black spherical particles of 40–50μ in average particle size were obtained.

Besides, the above procedure was conducted using 40 g of rutile type titanium oxide instead of 100 g of MA-100. White spherical particles of 40–50μ in average particle size were obtained.

Particles obtained in both procedures have good flowability.

EXAMPLE 17

8 g of Aerosil 200 and 500 ml of distilled water were charged into a 2.0 l separable flask.

There was added a mixture of 400 g of barium ferrite, 2 g of diethylaminoethyl methacrylate, 1 g of 2,2'-azobis-(2,4-dimethylvaleronitrile), 160 g of Piccolastic A-25 (trade name, styrene resin, manufactured by Esso Pet. Chem.) and 240 g of styrene. The mixture was heated to 65° C. while stirring at 200 rpm and polymerization was effected for six hours. After completion of polymerization brown spherical particles of 100–120μ in average particle size were obtained.

Besides, the above procedure was repeated using 15 g of Nigrosine NB conc (trade name, C. I. Acid Black 2) instead of 400 g of barium ferrite. Black spherical particles with slightly blue-purple color 100–120μ in average particle size were obtained.

Particles obtained in both procedures cannot be melted even in boiling water.

EXAMPLE 18

4 g of Aerosil Mox 170 and 600 ml of distilled water were charged into a 2.0 l separable flask.

There was added a mixture of 50 g of Aizen Opal Black WGH (trade name, C. I. Acid Black 52), 16 g of 2-hydroxy-3-acryloxypropyltrimethyl ammonium chloride, 1 g of lauroyl peroxide, 280 g of D.E.R 332 (trade name, epoxy resin, manufactured by Dow Chemical) and 120 g of methyl methacrylate. The mixture was heated to 70° C. while stirring at 200 rpm and polymerization was effected for five hours. After completion of polymerization reddish black colored spherical particles of 30–40μ in average particle size were obtained.

Besides, the above procedure was repeated using 100 g of fine powders of iron-nickel alloy instead of 50 g of Aizen Opal Black WGH. Grey brown spherical particles of 30–40μ in average particle size were obtained.

When 1 g of the particles obtained in each procedure of this Example was put uniformly on a paper sheet of A-4 size and passed between pressed metal rollers of 500 kg/30 cm long, they were fixed to the paper.

EXAMPLE 19

2 g of Aluminum Oxide C and 400 ml of distilled water were charged into a 2.0 l separable flask.

There was added a mixture of 100 g of magnetic iron powders, 2 g of methacrylic acid, 4 g of azobisisobutyronitrile, a resin solution of 4 g of Nittetsu Coumarone Resin NT-1 (trade name, coumarone resin, manufactured by Nittetsu Kagaku Kogyo, Japan) in 36 g of Versamid 140 (trade name, polyamide resin, manufactured by Daiichi General, Japan) and 360 g of methyl methacrylate. The mixture was heated to 80° C. while stirring at 200 rpm and polymerization was effected for five hours. After completion of polymerization black-brown spherical particles of 30–40μ in average particle size were obtained. The colored spherical resin particles were magnetic.

Besides, the above procedure was repeated using 40 g of Diacryl Supra Black BSL (trade name, C. I. Basic Black 8) instead of 100 g of magnetic iron powders. Bluish black spherical particles of 30–40μ in average particle size were obtained.

Particles obtained in each procedure of this Example were no-sticky and had good flowability.

EXAMPLE 20

8 g of Aluminum Oxide C and 500 ml of distilled water were charged into a 2.0 l separable flask.

There was added a mixture of 150 g of Monarch #800 (trade name, carbon black), 10 g of glycidyl methacrylate, 0.8 g of azobisisobutyronitrile, 40 g of acrylonitrile, 150 g of methyl methacrylate and a resin solution of 40 g of Malkeed No. 5 (trade name, rosin modified alkyd resin, manufactured by Arakawa Rinsan, Japan) in 160 g of Piccolyte S-10 (trade name, β-pinene resin, manufactured by Esso Pet. Chem.). The mixture was heated to 70° C. while stirring at 200 rpm and polymerization was effected for five hours. After completion of polymerization black spherical particles of 20–30μ in average particle size were obtained.

Besides, the above procedure was repeated using 20 g of α-iron sesquioxide instead of 150 g of Monarch #800. Red spherical particles of 20–30μ in average particle size were obtained.

Particles obtained in each procedure showed good flowability.

EXAMPLE 21

2 g of Aerosil 200 and 400 ml of distilled water were charged into a 2.0 l glass vessel.

There was added a mixture of 150 g of γ-iron sesquioxide, 2 g of N-n-butoxyacrylamide, 1.2 g of benzoyl peroxide, 60 g of Piccolastic A-25 (trade name, styrene resin, manufactured by Esso Pet. Chem.) and 340 g of styrene. The mixture was heated to 80° C. while stirring at 1000 rpm using TK Homomixer. Fifteen minutes after heating the particle size showed 15–20μ in average. After polymerization was conducted further six hours, the particle size remained unchanged and brown spherical particles of 15–20μ in average particle size were obtained.

Besides, using 150 g of Printex G (trade name, carbon black) instead of 150 g of γ-iron sesquioxide the above procedure was repeated. Black spherical particles of 15-20μ in aversge particle size were obtained.

Particles obtained in each procedure had good flowability and when they were rubbed several times with the tip of spoon in a watch glass, they showed stickiness.

EXAMPLE 22

4 g of Aerosil Mox 80 and 400 ml of distilled water were changed into a 2.0 l glass vessel.

There was added a mixture of 80 g of Direct Deep Black GX (trade name, C. I. Direct Black 38), 4 g of dicocoamine, 1 g of azobisisobutyronitrile, 120 g of Transphalt L-4 (trade name, aromatic petroleum resin, manufactured by Esso Pet. Chem.) and 280 g of styrene. The mixture was heated to 80° C. while stirring at 3000 rpm using Microagitor (trade name, manufactured by Shimazaki Seisakusho, Japan). Fifteen minutes after heating the particle size was 10-15μ in average and remained unchanged even after completion of six hour's polymerization. Greenish black spherical particles of 10-15 μ in average particle size were obtained.

Besides, using 150 g of a finely powdered nickel-iron-cobalt alloy instead of 80 g of Direct Deep Black GX, the above procedure was repeated. Grey brown spherical particles of 10-15μ in average particle size were obtained.

Particles obtained in each procedure of this Example showed good non-stickiness.

EXAMPLE 23

8 g of Aerosil 200 and 500 ml of distilled water were charged into a 2.0 l glass vessel.

There was added a mixture of 200 g of ferrosoferric oxide, 2 g of diethylaminoethyl methacrylate, 1 g of 2,2'-azobis-(2,4-dimethylvaleronitrile), 200 g of styrene resin (Piccolastic A-25, trade name) and 200 g of styrene. The mixture was heated to 65° C. while stirring at 3000 rpm in use of TK Homomixer. Fifteen minutes after heating the particle size was 10-15μ in average and remained unchanged even after completion of six hours' polymerization. Black spherical particles of 10-15μ in average particle size were obtained.

Besides, using 20 g of Raven 50 (trade name, carbon black) instead of 200 g of ferrosoferric oxide the above procedure was repeated. Black spherical particles of 10-15μ in average particle size were obtained. Charging amount of the black resin particles was measured by the Blow off method. The value of −20 μc/g was obtained.

Particles obtained in each procedure had good flowability, and softening point of which was 100° C. according to the ring and ball method. The partices were observed by a microscope and the particle number distribution is set forth in the following figure.

| | Particle Number Distribution % |
|---|---|
| 30-15 μ | 5 |
| 15-10 μ | 80 |
| 10-5 μ | 10 |
| 5-1 μ | 5 |

1.0 ml of the suspension obtained in each procedure of Example 23 was added to 100 ml of distilled water. The resulting suspension having a pH of 5.9 was charged into a quartz cell of 1.0 mm in thickness and 70 cm in length and subjected to electrophoresis under applied voltage of 14 Volt/cm. Polymer particles were transferred to the anode and the mobility was −0.8 μ/sec/Volt/cm. The mobility was measured adjusting a pH with KOH and HCl. The results are given in FIG. 2.

EXAMPLE 24

8 g of Aerosil 200 and 500 ml of distilled water were charged into a 2.0 l glass vessel.

There was added a mixture of 5 g of Miketazol Black 5GF (trade name, C. I. Disperse Black 30), 2 g of diethylaminoethyl methacrylate, 1 g of 2,2'-azobis-(2,4-dimethylvaleronitrile), 240 g of D. E. R. 330-J (trade name, epoxy resin, manufactured by Dow Chemical) and 160 g of styrene. The mixture was heated to 65° C. while stirring at 3000 rpm using the TK Homomixer. Fifteen minutes after heating, the particle size was 10-15μ in average. Thereafter the specific stirring apparatus was changed to a conventional stirrer of 100 rpm and polymerization was continued for six hours. The particle size remained unchanged till completion of polymerization. Greenish black sherical particles of 10-1582 in average particle size were obtained.

Besides, using 10 g of fine powders of magnetic aluminum-nickel-cobalt alloy instead of 5 g of Miketazol Black 5GF, the above mentioned procedure was conducted. Grey blue spherical particles of 10-15μ in average particle size were obtained. The colored spherical resin particles were magnetic.

When these particles were rubbed several times with the tip of spoon in a watch glass, they showed stickiness.

EXAMPLE 25

2 g of Aluminum Oxide C and 600 ml of distilled water were charged into 2.0 l glass vessel.

There was added a mixture of 15 g of ultramarine, 2 g of acrylic acid, 1 g of azobisisobutyronitrile, 120 g of methyl methacrylate and 280 g of styrene resin (Piccolastic A-5, trade name). The mixture was heated to 80° C. while stirring at 2000 rpm using the TK Homomixer. Thirty minutes after heating the particle size was 15-20μ in average, and remained unchanged even after polymerization of five hours. Blue spherical particles of 15-20μ in average particle size were obtained.

Besides, using 30 g of Nigrosine Base LK (trade name, C. I. Solvent Black 7) instead of 15 g of ultramarine, the above procedure was repeated. Black spherical particles with slightly blue-purple color of 15-20μ in average particle size were obtained.

Particles obtained in both procedures had good non-stickiness.

EXAMPLE 26

2 g of Aluminum Oxide C and 600 ml of distilled water were charged into a 2.0 l glass vessel.

There was added a mixture of 30 g of carbon black (MCF-88, trade name), 2 g of acrylic acid, 1 g o azobisisobutyronitrile, 120 g of methyl methacrylate and 280 g of styrene resin (Piccolastic A-5, trade name). The mixture was heated to 80° C. while stirring at 2000 rpm using the TK Homomixer. Thirty minutes after heating the particle size was 15-20μ in average. Thereafter the specific stirring apparatus was changed to a conventional stirrer of 100 rpm and polymerization was continued for five hours. The particle size remained unchanged till completion of polymerization. Black spherical particles of 15-20μ in average particle size were obtained.

Besides, using 20 g of lead yellow instead of 30 g of carbon black, the above procedure was conducted. Yellow spherical particles of 15-20μ in average particle size were obtained.

Particles obtained in both procedures had good non-stickiness.

EXAMPLE 27

8 g of Aerosil 200 and 500 ml of distilled water were charged into a 2.0 l glass vessel.

There was added a mixture of 150 g of zinc green, 2 g of diethylaminoethyl methacrylate, 1 g of 2,2'-azobis-(2,4-dimethylvaleronitrile), a resin solution of 30 g of a styrene-methyl methacrylate-butyl methacrylate copolymer (softening point, about 120° C.) in 170 g of styrene resin (Piccolastic A-25, trade name) and 200 g of styrene. The mixture was stirred using the TK Homomixer of 3000 rpm at normal temperature. The particle size was 10-15μ in average 15-20 minutes after stirring. Thereafter the specific stirring apparatus was changed to a conventional stirrer of 100 rpm annd polymerization was continued at 65° C. for six hours, during which the particle size remained unchanged. Green spherical particles of 10-15μ in average particle size were obtained.

Besides, using 50 g of carbon black (Printex 400, trade name) instead of 150 g of zinc green, the above procedure was effectd. Black spherical particles of 10-15μ in average particle size were obtained.

Particles obtained in each procedure of this Example had good flowability.

EXAMPLE 28

Polymerization was conducted in the same manner as in Example 27 using N-n-butoxyacrylamide instead of diethylaminoethyl methacrylate. Green spherical particles of 10-15μ in average particle size were obtained by the former procedure of Example 27 and by the latter black spherical particles of 10-15μ in average particle size were obtained.

Particles obtained in both procedures had good flowability.

REFERENCE EXAMPLE 6

A polymerization reaction mixture which was obtained from the same formulation as in Example 17 except diethylaminoethyl methacrylate was allowed to gel and no polymer particles were obtained.

REFERENCE EXAMPLE 7

A polymerization reaction mixture which was obtained from the same formulation as in Example 17 except Aerosil 200 was allowed to gel and no polymer particles were obtained.

REFERENCE EXAMPLE 8

4 g of partially saponified polyvinyl alcohol (Gosenol, trade name) and 500 ml of distilled water were charged into a 2.0 l separable flask.

There was added a mixture of 20 g of carbon black (MA-100, trade name), 1 g of 2,2'-azobis-(2,4-dimethylvaleronitrile), 160 g of styrene resin (Piccolastic A-25, trade name) and 240 g of styrene. The mixture was heated to 65° C. while stirring at 200 rpm and subjected to polymerization for six hours. Then black spherical particles in mixture of 1-2 mm and 200-300μ in particle size were obtained.

Besides, using 400 g of barium ferrite instead of 20 g of carbon black, the above procedure was conducted. Brown spherical particles in mixture of 1-2 mm and 200-300μ in particle size were obtained.

Particles obtained in borh procedures had stickiness and were inferior in flowability.

REFERENCE EXAMPLE 9

Polymerization was conducted in the same manner as in Reference Example 8 except stirring at 400 rpm. The reaction products had strong monomer odour and the conversion was about 70 wt.%. According to the former procedure of Reference Example 8, black spherical particles in mixture of 1-1.5 mm and 200-300μ in particle size were obtained. By the latter brown spherical particles in mixture of 1-1.5 mm and 200-300μ in particle size were obtained.

Particles obtained in both procedures were sticky and inferior in flowability, and further melt in a boiling water.

REFERENCE EXAMPLE 10

The polymerization reaction mixture of the same formulation as in Reference Example 8 was stably dispersed using the TK Homomixer of 3000 rpm for 30 minutes. Next, using a conventional stirrer of 200 rpm, the polymerization reaction mixture was heated to 65° C. and subjected to polymerization. Black spherical particles in mixture of 1-2 mm and 200-300μ in particle size were obtained by the former procedure of Reference Example 8 and brown spherical particles in mixture of 1-2 mm and 200-300μ in particle size by the latter.

Particles obtained in both procedures were sticky and inferior in flowability.

What is claimed is:

1. Fine spherical polymer particles with a uniform particle size distribution containing at least one member selected from the group of inorganic pigments and black coloring agents, which comprise polymerized products from polymerizable monomers and an inorganic dispersion stabilizer in which said polymerizable monomers are charged with cation or anion and said inorganic dispersion stabilizer has an opposite charge to said monomers; the surface of said polymer particles being firmly bound through ionic bond to and being completely covered with said inorganic dispersion stabilizer.

2. The polymer particles of claim 1 wherein the particle size is within the range of 2-50μ.

3. The polymer particles of claim 1 wherein said polymerizable monomers are charged with cation and the anionic inorganic dispersion stabilizer is colloidal silica or bentonite.

4. The polymer particles of claim 1 wherein said polymerizable monomers are charged with anion and the cationic inorganic dispersion stabilizer is aluminum oxide.

5. The polymer particles of claim 1 wherein said inorganic pigment is a magnetic substance which is selected from the group consisting of magnetic iron oxide and magnetic ferroalloy.

6. The polymer particles of claim 1 wherein said black coloring agent is carbon black or solvent dyes, basic dyes or acid dyes of black color.

7. Fine spherical polymer particles with a uniform particle size distribution containing at least one member selected from the group consisting of inorganic pigments and black coloring agents, which comprise polymerized products from polymerizable monomers having a resin liquid at normal temperature involved therein and an inorganic dispersion stabilizer in which said polymerizable monomers are charged with cation or anion and said inorganic dispersion stabilizer has an opposite charge to said polymerizable monomers, the surface of said polymer particles being firmly bound through ionic bond to and being completely covered with said inorganic dispersion stabilizer.

8. The polymer particles of claim 7 wherein the resin liquid at normal temperature is involved in said polymerizable monomers in an amount of 10–90% by weight of the latter.

9. The polymer particles of claim 7 wherein said resin liquid at normal temperature is aromatic petroleum resins, α-pinene resins, β-pinene resins, dipentene resins, terpenephenol resin, α-pinene-phenol resins, styrene resins, epoxy resins or polyamide resins.

10. The polymer particles of claim 7 wherein said resin liquid at normal temperature is a liquid resin mixture having a resin solid at normal temperature dissolved therein.

11. The polymer particles of claims 1 or 7 wherein said inorganic pigment is within the range of 0.1–70% by weight of the polymerizable monomers or ones having a resin liquid at normal temperature involved therein.

12. The polymer particles of claims 1 or 7 wherein said black coloring agent is within the range of 0.1–30% by weight of the polymerizable monomers or ones having a resin liquid at normal temperature involved therein.

13. A process for the preparation of fine spherical polymer particles with a uniform particle size distribution containing at least one member selected from the group consisting of inorganic pigments and black coloring agents, which comprises effecting a suspension polymerization of polymerized products from polymerizable monomers and an inorganic dispersant in which said polymerizable monomers are charged in water (a) with cation by adding a cationic polymerizable monomer or difficulty water soluble organic amines or (b) with anion by adding an anionic polymerizable monomer and said inorganic dispersant in water has an opposite charge to said polymerizable monomers, and said suspension polymerization being under such a condition that the surface of the polymerizable monomer particles is ionically bound to and uniformly covered with said inorganic dispersion stabilizer.

14. The process of claim 13 wherein said polymerizable monomers are monomers having a resin liquid at normal temperature involved therein.

15. The process of claims 13 or 14 wherein said ionic substances are used in an amount of at least 0.1% by weight of said polymerizable monomers or monomers having a resin liquid at normal temperature involved therein.

16. The process of claims 13 or 14 wherein said inorganic dispersion stabilizer is used in an amount of at least 0.1 phr by weight of said polymerizable monomers or monomers having a resin liquid at normal temperature involved therein.

17. The process of claim 13 wherein said polymerizable monomers are charged with cation and the anionic inorganic dispersion stabilizer is colloidal silica or bentonite.

18. The process of claim 13 wherein said polymerizable monomers are charged with anion and the cationic inorganic dispersion stabilizer is aluminum oxide.

19. The process of claim 13 wherein said suspension polymerization is effected using a homogenizer with high shearing force.

20. The process of claim 19 wherein the particle size is maintained within the range of 2–30μ.

21. The process of claim 20 wherein the ionic substances are used in an amount of more than 0.4% by weight of the polymerizable monomers.

22. The process of claim 20 wherein the inorganic dispersion stabilizer is used in an amount of more than 0.4% by weight of the polymerizable monomers.

* * * * *